July 14, 1936.   O. CHRISTIANSEN   2,047,768
ARTIFICIAL BAIT
Filed Aug. 1, 1935
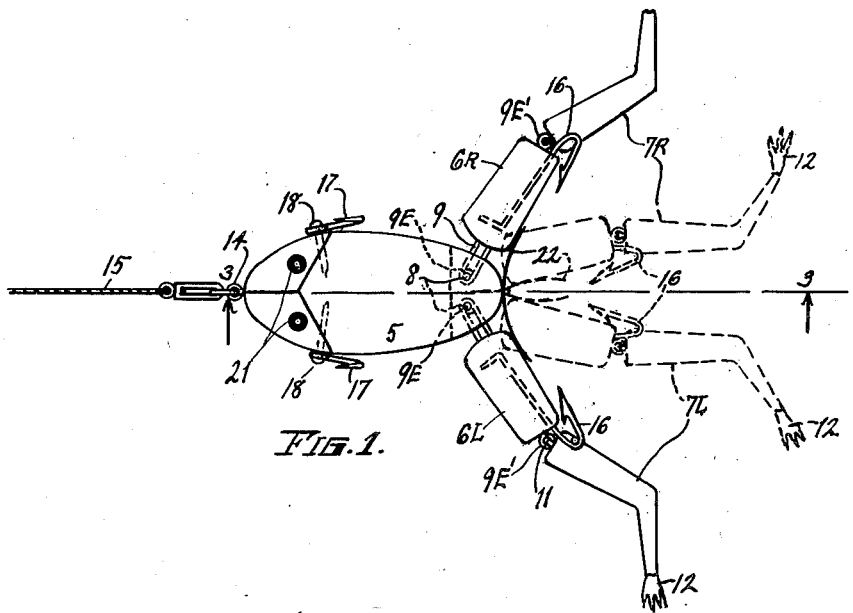
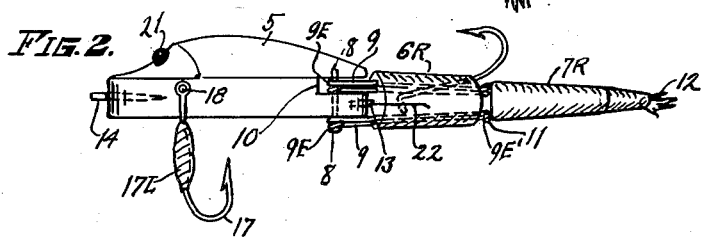
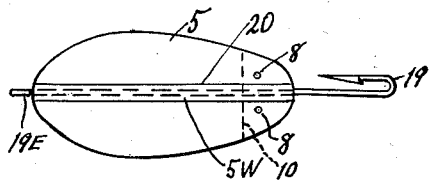
INVENTOR:
Oscar Christiansen
BY David E. Carlsen
ATTORNEY.

Patented July 14, 1936

2,047,768

UNITED STATES PATENT OFFICE 2,047,768

ARTIFICIAL BAIT

Oscar Christiansen, St. Paul, Minn.

Application August 1, 1935, Serial No. 34,164

3 Claims. (Cl. 43—42)

This invention relates to improvements in fishing baits or lures, particularly an artificial bait simulating a frog and the construction of which involves certain features hereinafter described and claimed.

One object of this invention is to provide an imitation frog bait to be used particularly as a so-called surface bait, to be pulled through or at the top surface of the water the pulling action of a fish line imparting movement to the legs of the frog to thus closely copy the actual or natural swimming action of a real frog. Other objects include a certain body and leg construction and series of fish hooks fixed in said parts in a new and unique manner, the positioning of said hooks together with the particular shapes and assembly of parts being such that when the bait is cast on the water, it automatically is positioned exactly as a live frog normally lies on or swims in the water.

Other objects and the preferred construction of my bait is hereinafter fully disclosed reference being had to the accompanying drawing, in which,—

Fig. 1 is a top view of my improved bait in a form embodying four fish-hooks.

Fig. 2 is a left (or lower) side view of Fig. 1 with the left leg of the frog omitted and including a minor modification.

Fig. 3 is a longitudinal sectional elevation as on line 3—3 in Fig. 1, omitting the front legs and a modification of construction involving a single, central, large fish-hook in place of the imbedded smaller hooks shown one in each hind leg in Fig. 1.

Fig. 4 is a bottom view of only the body section of the bait shown in Fig. 3.

Referring to the drawing by reference numerals, the bait shown is approximately full scale, said bait comprising a body section 5, right and left thigh sections of a pair of legs designated 6R and 6L, and pivotally connected outer leg sections 7R and 7L extending respectively from said thigh sections. The thigh sections are pivotally connected each as at 8 comprising a pin in the rear part of the body 5.

The body and leg parts thus far described are made of any suitable material which is buoyant, preferably a good seasoned wood for the body, but the leg sections are preferably of molded material preferably a substance known as plastic wood.

Each of the leg sections is cast about a continuous wire center or core 9 formed exteriorly of the respective ends of the thigh sections with eyes 9E. Forwardly of the thigh section said wire extends outwardly in two vertically spaced, parallel, parts each with an eye at the forward terminus and said pair of eyes registering vertically. The rear terminus of the body 5 is slitted horizontally to provide a rearward opening 10 in which is pivotally retained one of each of said pair of eyes 9E while the other pair of said eyes is exteriorly of and at the under side of said body. The pivot comprises merely a small nail 8 passing vertically through each pair of said eyes and imbedded in the wood. Thus each thigh section has a pivot in the body said pivots being spaced transversely and corresponding to the hip joint of a live frog. The outer wire parts of each thigh section also protrude in the form of a coiled eye 9E' in which is pivotally retained the forwardly exposed wire core 11 of an outer leg section 7R or 7L. Said latter leg sections are tapered and formed with an outward bend and the extremity may comprise a leather or fabric terminus 12 simulating the foot of a frog.

It will be readily understood that the leg sections are designed in outwardly tapering and irregular form and in proportion to the body according to the general proportions of a frog. The body portion of the bait, particularly, is flat and in the finished product the entire under side of the bait is preferably white or of light color. The upper areas are preferably colored mainly green with suitable dots and stripe effects to closely resemble the natural colors of the type of frogs most used for live bait.

It will be readily understood that the limbs and body made as above stated and illustrated in the drawing comprise a life-like resemblance including the hinge connections corresponding to the joints of a frog. The legs are normally spread, as to full line positions shown in Fig. 1, by means of a single piece of spring wire 22 fastened centrally to the rear central part of body 5, as with a staple 13. The end parts of the wire bear forwardly against the inner areas of the thigh sections thus holding the legs initially spread as stated.

14 is an eyelet at the front end of the body to which is suitably connected the line 15 (see Fig. 1).

When this bait is cast on the water the fisherman begins to reel in the line 15 pulling the bait along the surface. By making a series of jerks on the line, intermittently; the leg members are closed toward each other, by water resistance and against the pressure of spring 22. After each jerk the legs spring back to spread position. Thus the successive spreading and closing movements simulate the swimming action of a frog and attract fish to the bait.

It is well known that fish approach this type of live or imitation bait in various ways, some from behind, from either side or at the front of the bait. Therefore I have provided for this bait a series of hooks placed and designed to catch the fish if the bait is grasped from any one of all possible angles, as follows:—

In Fig. 1 there is a pair of rear fish hooks 16 one in each thigh part of a leg, the shank of each hook imbedded in the molded leg part and the hooked, barbed end of the fish hook protruding rearwardly, upwardly and in an inwardly inclined plane, its barb projecting forwardly above the leg, as shown.

In all forms of my bait I provide also a pair of forward fish hooks 17, one at each side of the main plug toward the front in positions corresponding to the locations of the front legs of a frog. Each hook hangs loosely (pivotally) on a nail 18 driven into the plug. The shank of each said hook 17 may, as in Fig. 2, be enlarged as 17L and suitably colored. These depending front hooks cause the entire bait to be balanced properly right side up. This balance is further made more natural by the weight of the legs and metal parts at the rear, which keeps said rear part of the frog bait partially submerged and the entire bait therefore assumes a slightly inclined position in the water with the head uppermost.

In a modified form of this fish lure, Fig. 3, there are no fish-hooks in the leg sections but in place of these I substitute a single, larger fish-hook 19 the shank of which is imbedded longitudinally in the lower part of body 5 and the hooked and barbed end of which is exposed rearwardly and centrally of said body with the barb projecting forwardly as clearly shown. The front end of the shank comprises the usual eye 19E which is exposed forwardly of plug 5 and comprises the connecting means for a fish line.

In the latter form of the bait the body 5 is merely grooved longitudinally, the shank of the hook 19 laid therein and the groove 20 merely filled with plastic wood or other suitable material (designated 5W in Figs. 3 and 4) to seal the opening and retain the shank of hook 19 rigidly.

21 in Figs. 1, 2 and 3 designates a pair of eyes preferably comprising a pair of bead-head tacks properly located.

I claim:

1. An artificial bait comprising a preferably buoyant body section, hooks pivotally secured to the front end of the body simulating the front legs of a frog, hind legs pivotally retained in the rear end of the body, all in proportions and colors simulating a live frog; said body part being slitted transversely at its rear part and said leg sections comprising in part a forward metallic extension of each rear leg being formed with an eye, said eye parts of both legs being pivotally retained in said body slit, a yieldable two-armed spring fixed at the rear end of the body and having its arms arranged to bear simultaneously against the inner parts of the rear legs near said body, said spring means normally retaining the said legs spread apart but adapted to yield when the legs are impelled toward closing position.

2. An imitation fish bait resembling a frog and comprising an elongated body, a pair of depending small hooks simulating front legs and a pair of larger rear legs pivotally retained each on a pivot in the rear part of the body, each rear leg comprising a thigh section directly connected to the body on said pivot and an outer leg section pivotally connected to each thigh section, spring means yieldably pressing the rear legs apart, a fish-hook rigidly retained in each thigh section with its shank retained longitudinally therein and its barbed end exposed upwardly and forwardly at the outer end of the thigh section and forward of the pivotal connection of the two leg sections.

3. A fish lure comprising a device simulating a frog and comprising a body with small front legs each comprising a depending fish hook, a pair of rear legs pivotally connected to the rear end of the body, each on a pivot pin, spring means yieldably spreading the rear legs, each rear leg comprising a thigh section and a pivotally connected outer foot member, a sectional wire extending longitudinally through each rear leg, and a pin extending vertically through the body for each rear leg and comprising a hip joint therefor, said sectional wire forward of the thigh comprising two vertically spaced wires each with a loop at the front extremity for pivotally engaging said pin, substantially as shown and described.

OSCAR CHRISTIANSEN.